(12) United States Patent
Bugbee

(10) Patent No.: US 7,793,106 B2
(45) Date of Patent: Sep. 7, 2010

(54) METHOD AND SYSTEM FOR CERTIFYING THE AUTHORITY OF A SIGNER OF AN ELECTRONIC DOCUMENT

(75) Inventor: Larry Bugbee, Kent, WA (US)

(73) Assignee: The Boeing Company, Chicago, IL (US)

( * ) Notice: Subject to any disclaimer, the term of this patent is extended or adjusted under 35 U.S.C. 154(b) by 1421 days.

(21) Appl. No.: 11/205,970

(22) Filed: Aug. 17, 2005

(65) Prior Publication Data

US 2007/0043949 A1 Feb. 22, 2007

(51) Int. Cl.
*H04L 9/00* (2006.01)
(52) U.S. Cl. ............... 713/176; 713/150; 713/168
(58) Field of Classification Search .............. 713/176, 713/168, 150
See application file for complete search history.

(56) References Cited

OTHER PUBLICATIONS

Ron Singh, PLSGeometronics Manager; Digital Signatures for Engineering Documents Sep. 30, 2008.*
Washington Secretary of State; http://www.sos.wa.gov/ea/overview_faq.aspx; printed out in year 2009.*
Authentication is not Authorization?! And what is a "digital signature" anyway? Prepared by R. David Vernon; Last Revised Dec. 2001.*
A group digital signature technique for authentication; Chin-Ming Hsu; Security Technology, 2003. Proceedings. IEEE 37th Annual 2003 International Carnahan Conference on Publication Year: 2003, pp. 253-256.*

A secure and trusted time stamping authority Takura, A.; Ono, S.; Naito, S.; Internet Workshop, 1999. IWS 99 Publication Year: 1999, pp. 88-93.*
New approaches to digital evidence; Maurer, U.; Proceedings of the IEEE vol. 92, Issue: 6; Publication Year: 2004, pp. 933-947.*
"Group Signature where Group Manager, Members and Open Authority are Identity Based", by Victor K. Wei, Tsz Hon Yuen and Fangguo Zhang; pp. 1-17.
"XML Security: Control Information access with XACML", by Manish Verma (mverma@secf.com), Center head and VP Delivery, Second Foundation; pp. 1-14; dated Oct. 18, 2004 ; at http://www-128.ibm.com/developerworks/xml/library/x-xacml/.
"OASIS Digital Signature Services (DSS) TC", by Nick Pope (pope@secstan.com) and Hal Lockhart (hlockhar@bea.com), pp. 1-2; at http://www.oasis-open.org/committees/workgroup.php?wg_abbrev=dss.
"OASIS eXtebsible Access Control Markup Language (XACML) TC" by Hal Lockhart (hlockhar@bea.com), Bill Parducci (bill.parducci@simulalabs.com) and Anna Anderson (Anne.Anderson@Sun.com) ; pp. 1-5; at http://www.oasis-open.org/committees/workgroup.php?wg_abbrev=xacml.
"OASIS" pp. 1-2; at http://www.oasis-open.org/home/index.php.
OASIS SAML V2.0 Executive Overview, Committee Draft 01, Apr. 12, 2005;, approved by the Security Services Technical Committee on Apr. 12, 2005, pp. 1-7; at http://www.oasis-open.org/committees/documents.php?wg_abbrev=security.

(Continued)

*Primary Examiner*—David Y Jung
(74) *Attorney, Agent, or Firm*—Yee & Associates, P.C.; John A. Lepore

(57) ABSTRACT

Method and system for endorsing and verifying the authority of a digital signature is provided. The system includes, a server that is operationally coupled to a user's computer via a network link, wherein the server receives a signed document; the server identifies the type of document submitted and the signer's authority to sign it; and if all conditions are met, the server provides a signed statement or endorsement stating the user was authorized to sign the electronic document.

27 Claims, 3 Drawing Sheets

OTHER PUBLICATIONS

"SAML 2: The building blocks of Federated Identity" by Paul Madsen; dated Jan. 12, 2005; at http://www.xml.com/pub/a/2005/01/12/sam12.html; pp. 1-7.

"Legally enforceable electronic signatures using digital signature technology" pp. 1-2;; at http://www.yozons.com/pub/features/signatures.jsp.

"Yozons—Secure Messaging ensures the privacy of your business processes" ; p. 1, at http://www.yozons.com/pub/features/secureMessaging,jsp.

Yozons—Industry standard technologies; p. 1; at http://www.yozons.com/pub/aboutUS/technology.jsp.

Yozons—Thanks to those who helped make it happen; at http://www.yozons.com/pub/aboutUs/vendors.jsp, pp. 1-3.

* cited by examiner

METHOD AND SYSTEM FOR CERTIFYING THE AUTHORITY OF A SIGNER OF AN ELECTRONIC DOCUMENT

BACKGROUND OF THE INVENTION

1. Field of the Invention

The present invention relates to electronic documents, and more particularly, to a method and system for endorsing and verifying the authority of a signer of an electronic document.

2. Background

Electronic documents (interchangeably referred to as "content" or simply "document" throughout this specification) are commonly transferred, shared and viewed using present day networks. Examples include e-mails, spreadsheets, text files, XML files, videos, music, executable programs and numerous other forms of digital data or content.

Encryption and digital signatures are used in the electronic world to secure electronic documents. A digital signature (interchangeably referred to as "signature" throughout this specification) can provide assurance that an electronic document is authentic. Authentic in this sense means that one knows who signed the document and that the document has not been altered since it was signed.

A "key pair" is typically used in public key cryptography. A key pair is composed of a private key and a corresponding public key. The public and private key work only with each other, that is, something signed with one private key cannot be verified with any other key except the public key of the same key pair.

Users (signers) keep their private signing keys secret, however, the public key, can be made public, as long as one knows which public key belongs to whom. This is handled by creating and publishing, or otherwise making available, public key certificates digitally signed by a Certificate Authority (CA). The certificates, or "certs", are a specialized document that binds a public key to the identity of its owner and commonly have an expiration date, for example, two years. This is commonly used in Public Key Infrastructures (PKI) and forms the basis of knowing the identity of the signer.

Just as users protect their private signing keys, they also securely receive and store, by trusted processes, the public key certificates of the CAs they trust so that they can rely on the results of the digital signature verification process.

Signing a document involves passing the document or data to be signed through a hashing algorithm to create a hash, also known as a message digest. This hash is a string of bits, sometimes viewed as a number, which represents the document. The hash is constructed in such a way that any change to the document results in a different hash value. Further, the hash algorithm is cryptographically strong, that is, the hash is a calculated in such a way that it is computationally infeasible to find a second change, perhaps indiscernible to a human reader, which would yield the same hash value. This gives high assurance that if new hash values remain the same, the document remains unaltered.

The hash, along with the signer's private key, is then fed to another algorithm to produce a signature (another string of bits). The signature, along with some descriptive information, is frequently appended to the document, and should remain with the document for later verification.

Signatures are flexible. A single signature can cover, or apply to, all combinations of single or multiple documents in their entirety, and/or single or multiple portions of documents.

Another variation makes use of transitive properties where one signature can sign other hashes and/or other signatures, depending on one's objective. For example, it is not uncommon to see a hash of a document be itself the target of a signature (where the first hash is itself hashed to create a second hash which is then provided to the signing algorithm). Signing a hash of a document can, under the right conditions, provide the same integrity protection as signing the document directly.

Verifying the signed document to determine its authenticity involves calculating a fresh hash of the document in question. This new hash, the signature, and the signer's public key are then provided to another algorithm which will identify whether the document is or is not authentic. The verification process continues with several steps to assure the public key certificate, from which the signer's public key was extracted, is also authentic. (The certificate is also a signed document, signed by the CA, certifying the embedded public key belongs to the stated identity.) To be complete, there are other technical functions that need to be performed such as ensuring the certificate hasn't expired and the signer's certificate wasn't revoked and posted on a Certificate Revocation List (CRL).

Various standard techniques exist for digital signatures. For example, the Digital Signature Standard (DSS) is based on a type of public key encryption method that uses the Digital Signature Algorithm (DSA). The DSS is a standard for digital signatures that has been endorsed by the United States government. The DSA algorithm uses public and private keys, the internals of which are specific to that algorithm. Different algorithms typically require key pairs with different internals.

Conventional digital signature schemes focus on establishing the identity of the signer. This is usually accomplished by verifying the signer's digital signature (establishing the document remains unchanged since originally signed), and then verifying the Certificate Authority's (CA) signature of the signer's public key certificate.

When a signed document names a person in the document and obligates that person in some way, as in a mortgage loan agreement, then the authority of the signer can be inferred from the context of the situation and the signer's attestation.

But when a person signs a document on behalf of a company, or the signer has been granted some special privileges or authority, there is typically no convenient way to know the authority of the signer just by looking at the document. The signer's title might appear in the document, but any such claim of authority would be self-proclaimed and subject to question. A telephone call or accessing a special database might establish that authority, but simply looking at the document does not. This approach has shortcomings because people and companies change over time, and making telephone calls can be impractical. Maintaining databases for extended period, for example, 10, 20, 30 or more years can become very expensive and problematic, especially when companies merge or are out of business.

Also, the signer may be authorized to sign that kind of document, but with limited authority. For example, a person may be allowed to sign purchase orders, but those purchase orders are not to exceed $100,000. Conventional systems fail to provide a convenient methodology for a relying party to be able to establish that authority years later and perhaps a half a world away.

Therefore, there is a need for a method and system, where information contained within a signed document, by which a relying party can efficiently gain assurances that the authority of a signer, was not exceeded.

SUMMARY OF THE PRESENT INVENTION

In one aspect of the present invention, an automated method for verifying the authority of a signer of an electronically signed document is provided. The method includes, receiving a signed document; verifying the identity of the signer; establishing the type of signed document; establishing the signer's authority to sign the type of electronic document identified above and adding an authority endorsement to the document.

In another aspect of the present invention, an automated method for signing on behalf of a signer and endorsing the authority of the signer is provided. The method includes receiving a document; verifying the identity of the signer; signing on behalf of the signer; establishing the type of document; establishing the signer's authority to sign the type of electronic document identified above; and adding an authority endorsement to the document.

In yet another aspect of the present invention, an automated method for signing on behalf of a signer whose public key certificate contains an authority or policy extension is provided. The method includes, receiving a document; verifying the identity of the signer; establishing the type of document; establishing the signer's authority to sign the type of electronic document identified in step c; and signing on behalf of the signer.

In yet another aspect of the present invention, a system for verifying the authority of a signer of an electronically signed document is provided. The system includes a server for receiving a signed document; verifying the identity of the signer; establishing the type of signed document; establishing the signer's authority to sign the type of electronic document; and adding an authority endorsement to the document.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

In one aspect of the present invention, an automated method for providing an authority endorsement of a digital signature is provided. The method includes a trusted authority server receiving a digitally signed document, identifying the type of document submitted, establishing the signer's authority (types of documents and other limitations and constraints), verifying the signer's signature to insure that it properly signed the submitted document, inspecting the document to assure limits haven't been exceeded, adding an endorsement of the signer's authority, and the return of an enhanced document.

An authority endorsement is defined to be an attestation by the server vouching for the signer's authority, and a digital signature by the server covering, the attestation and the signer's signature. An attestation is a natural, human language statement that the signer is within their authority and that the trusted authority server vouches for same. An attestation might contain wording such as, "I hereby certify that John Smith is authorized to sign this building lease agreement." The attestation may also contain information in structures and formats more suitable for machine processing and automated implementations. The trusted server adds the authority endorsement after the necessary conditions, limitations, and other constraints have been satisfied.

In another aspect of the present invention, a method for later verifying the authority endorsement is provided. The method includes presenting the attestation for visual and/or automated processing, verifying the signature of the trusted server (to assure the attestation and the user's signature remain unaltered), and verifying the public key certificate of the trusted server.

To facilitate an understanding of the preferred embodiment, the general architecture and operation of a computing system will be described. The specific architecture and operation of the preferred embodiments will then be described with reference to the general architecture.

Figure 1A:
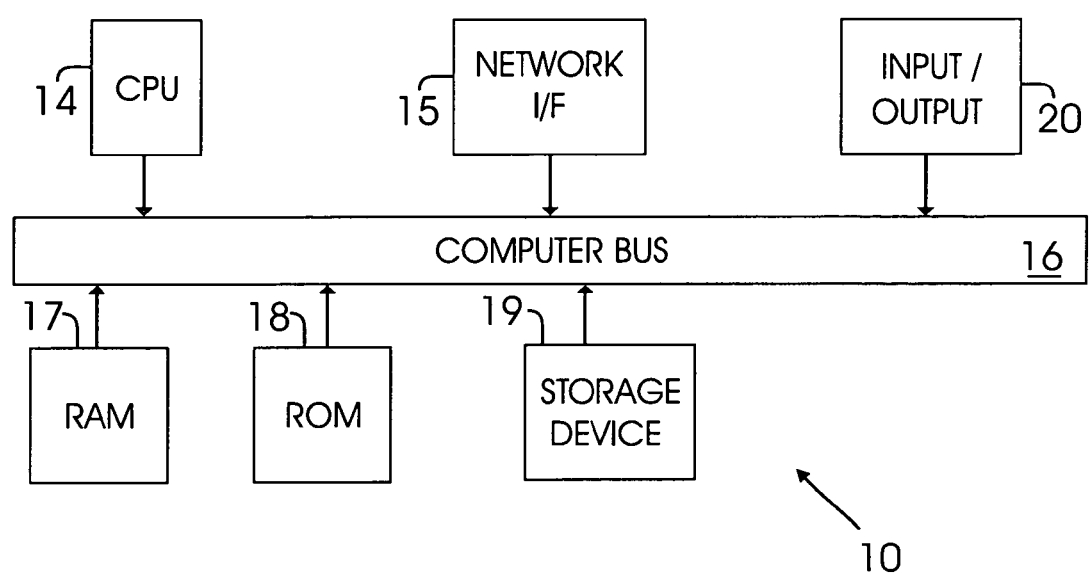
FIG. 1A is an abstracted version of a computer system used, according to one aspect of the present invention.
Figure 1B:
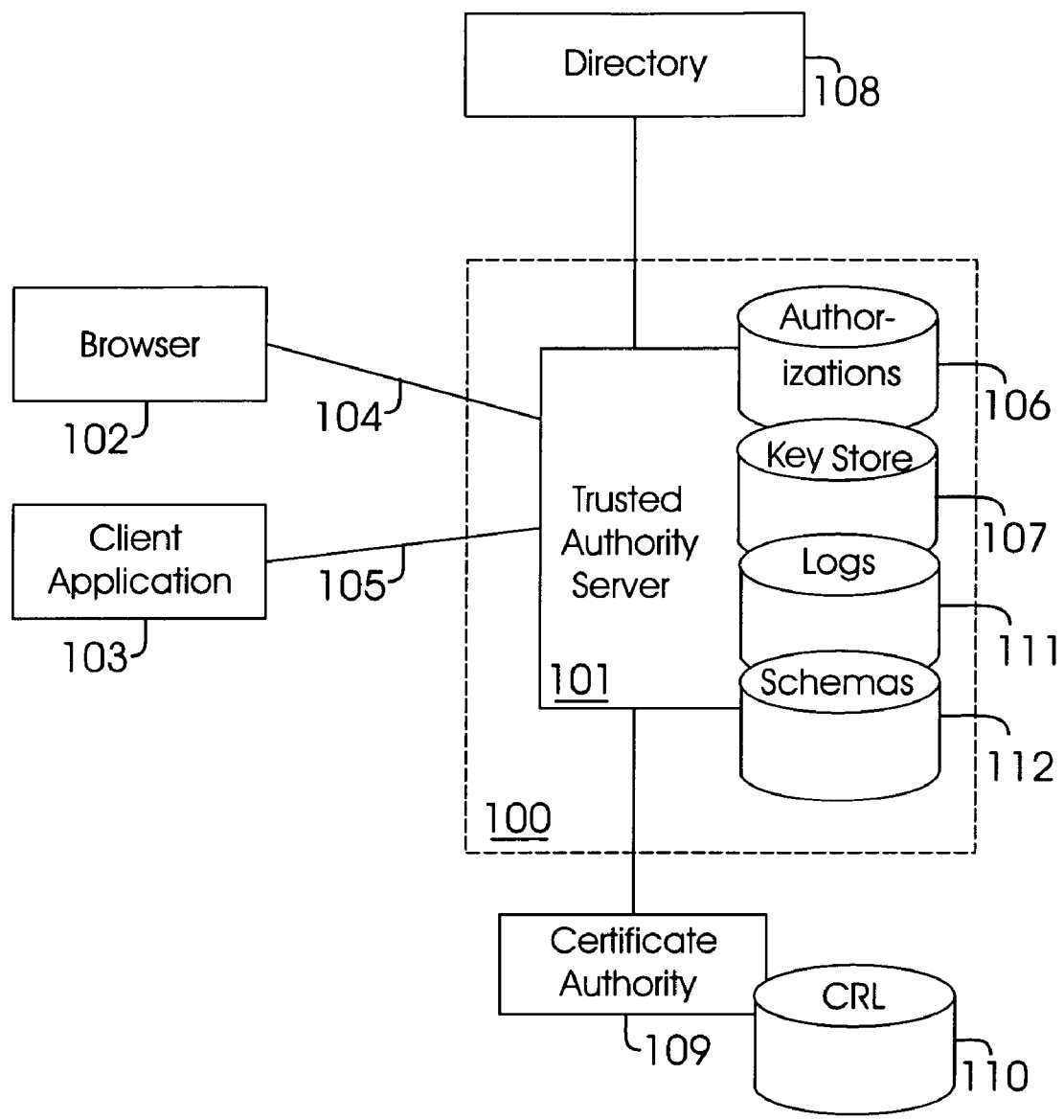
FIG. 1B shows a block diagram of a system, sometimes called a service, used for verifying user authority, according to one aspect of the present invention.

FIG. 1A shows an abstracted view of a computing system 10 used for executing the adaptive aspects of the present invention. The computing system includes a central processing unit ("CPU") 14 for executing computer-executable process steps and interfaces with a computer bus 16. Also shown in FIG. 1B is a network interface 23 that provides network connectivity to the computing system.

Input/output block 20 is intended to represent plural input devices, such as a mouse and keyboard that allow a user to interact with the computer system and one or more output devices, for example, a monitor and printer and others.

Storage device (or mass storage system) 19 is provided and stores operating system program files, application program files (for example, client application 103, FIG. 1A), web browsers (102, FIG. 1B), and other files. Some of these files are stored using an installation program. For example, CPU 14 executes computer-executable process steps of an installation program so that CPU 14 can properly execute the application program.

Random access memory ("RAM") 17 also interfaces to computer bus 16 to provide CPU 14 with access to memory storage. When executing stored computer-executable process steps from storage device 19 (or any other storage media), CPU 14 stores and executes the process steps out of RAM 17.

Read only memory ("ROM") 18 is provided to store invariant instruction sequences such as start-up instruction sequences or basic input/output operating system (BIOS).

It is noteworthy that the present invention is not limited to the FIG. 1A architecture. For example, notebook or laptop computers, handheld devices, set-top boxes or any other system capable of running computer-executable process steps, as described below, may be used to implement the various aspects of the present invention. Furthermore, system 10 configuration may be modified if system 10 is used as a server (101, FIG. 1B, described below).

Trusted Authority Server:

FIG. 1B shows a simplified block diagram of system 100, according to one aspect of the present invention. System 100 is typically located in a secured data center and may require strong authentication for various sensitive operations.

System 100 includes a trusted authority server 101 (may also be referred to as server 101) that interfaces with a client browser 102 and/or a client application 103 by a user using a computing system (similar to computing system 10, FIG. 1A). Browser 102 and application 103 can communicate with server 101 using standard communications protocols such as HTTP and SOAP (incorporated herein by reference in their entirety), via network links 104 and 105, most probably secure.

A web browser 102 operating on a user's computing system may be used by the signer to sign documents if the browser has all the requisite software such as plug-ins or applets, and access to all necessary data, such as private signing keys. The web browser 101 may be used to log-in a manager or other authorized person to access server 101 and act as a front-end for various maintenance operations on server 101.

Server 101 can access a list, a table, and/or a database of authorizations 106 that provide specific authority information about specific individuals. This information includes the identity of authorized signers and sufficient information on how to authenticate them should that be necessary, or where to get such information. Information from authorizations 106 also includes the kinds of documents signers are allowed to sign and any additional constraints such as monetary limits, date periods, and time periods the organization's management sees fit to impose. Human natural language statements and other data that might find their way into an attestation may also be stored in authorizations 106. It is noteworthy that authorizations 106 are maintained by authorized personnel of the organization granting the authority. The fact that authorizations 106 is maintained is important to this invention. Exactly how an organization chooses to maintain authorizations 106 is not important to this invention.

Server 101 can also access a secure key store 107 for its private signing key and any public key certificates of CAs it needs to trust.

Server 101 may need to communicate with other services such as a directory 108 service or a certificate authority 109 for, amongst other things, Certificate Revocation Lists (CRL) 110. (A CRL may be part of a directory 108.)

Server 101 also maintains transaction logs 111. Logs 111 may include, without limitation, the date and time, authenticated signer identity, the formal identity of server 101, the signer's signature value, server 101's signature value, the attestation itself, any hashes (message digests) of interest, and any error conditions and dispositions.

Server 101 can also access schema 112. Server 101 not only verifies the authority of the signer but also verifies that the correct document is being signed. If XML documents are submitted, an XML schema could be used to determine the exact type of document submitted. Other techniques such as regular expressions might be used. Whatever the technique, the information on how the system would be able to discriminate between document types and identify the specific document submitted could be stored in schemas 112.

The information in authorizations 106, key store 107, logs 111, and schemas 112 may be stored locally or provided by other servers or services and as might be the case with distributed computing systems. What is important is the kind of data represented; not how the data is stored, accessed, or transmitted.

Server 101 performs numerous detail tasks in the performance of its duties. Some of the major tasks are listed below:

Server 101 accepts signed documents from either browser 102 or client application 103, is informed of which signer signatures need authority endorsements via request information received from browser 102 or client application 103 if not obvious from the document itself; verifies that those signatures are indeed valid using standard PKI and public key cryptography techniques; ascertains the authority of those signers from information obtained from authorizations 106; validates that the submitted document is indeed one of those the signer is authorized to sign for information obtained from authorizations 106 and schemas 112; verifies additional constraints as may have been imposed by the organization and encoded in authorizations 106, and when all conditions are satisfied, server 101 applies an authority endorsement as described previously, and the enhanced document is returned to the browser 102 or the client application 103.

When server 101 operates as a trusted authority server, the process for determining, years later, the authority of an official document's signers is simplified. If a relying party has the self-contained document, all the necessary public key certificates, including those of the trusted CAs, no additional sources of authority information are needed. The process is further enhanced if server 101's key is strong and its public key certificate has a long expiry.

In one aspect, the extensible Markup Language (XML) (incorporated herein by reference in its entirety) may be used with the adaptive aspects of the present invention. XML is defined by the WorldWide Web Consortium (W3C), and is oftentimes used to format and describe data for exchange between computing entities. One of the many XML standards is XML Signatures and it provides a standardized way to add digital signatures to XML formatted data and documents, and does so in ways that foster interoperability between computing entities.

a. XML and XML Signatures may be used in one aspect of the present invention. It is noteworthy that the present invention is not limited to XML and XML signatures and can be applied to other data formats and structure schemes.

Figure 2:
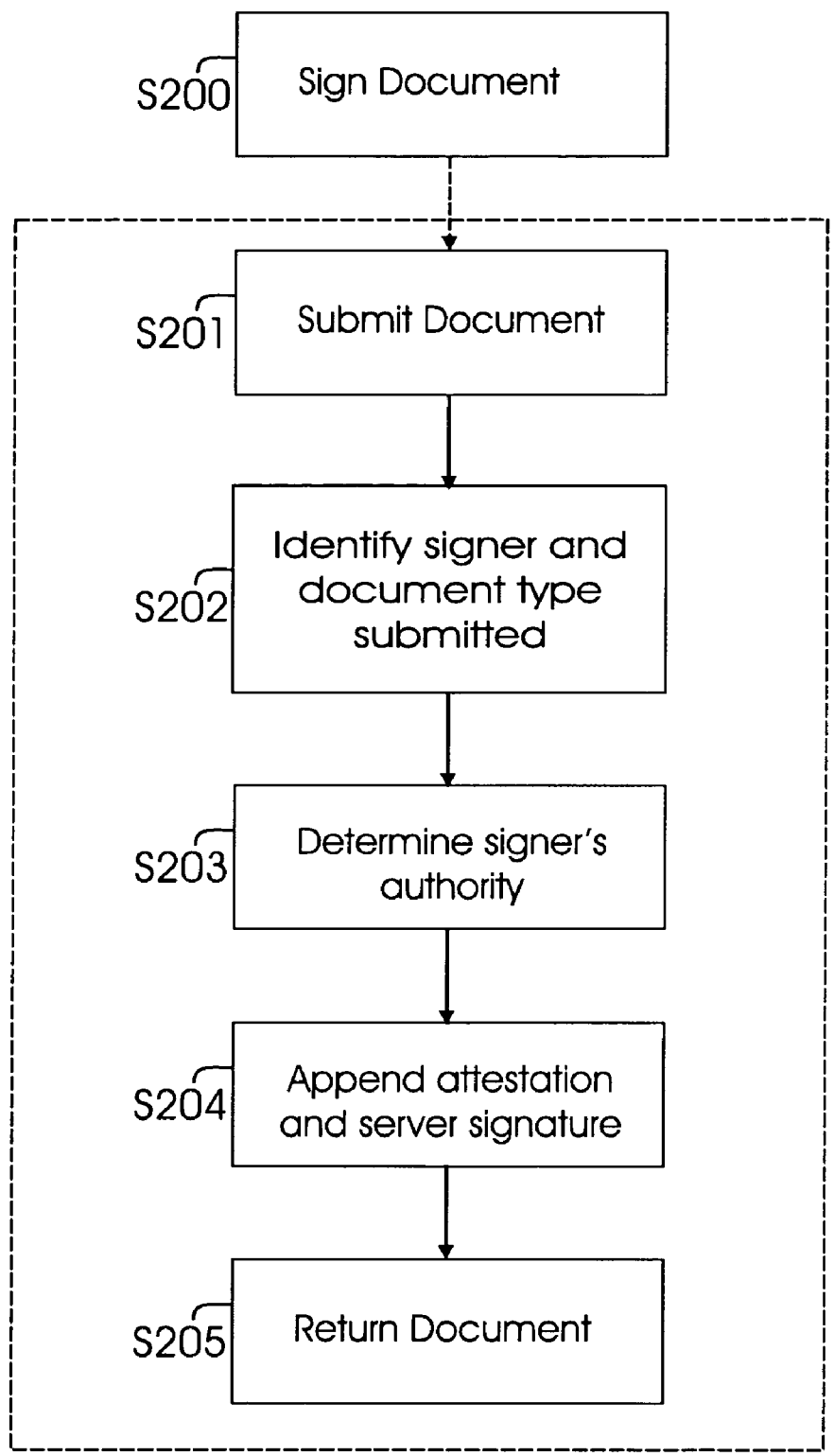
FIG. 2 shows a process flow diagram for using the system of FIG. 1B, according to one aspect of the present invention.

Process Flow:

FIG. 2 shows a process flow diagram according to yet another aspect of the present invention. Referring to FIG. 2, the Trusted Authority Server 101 of FIG. 1 is performing the steps shown in the dotted box of FIG. 2 where a user sends a signed document to server 101 for processing and server 101 provides an authority endorsement.

In step S200, a user, also referred to as the signer, signs an electronic document. The signer may use client application 103, a browser 102 with supplemental software such as a plug-in or an applet, or virtually any other standard and/or custom signing tool or process for signing the document.

In step S201 and subsequent to signing the document, a user, not necessarily the signer, accesses server 101 and may be optionally authenticated by server 101. (This user may or may not be the signer identified in step S200. It could be that a third party wants to have an authority endorsement added and that is permitted.) This user submits the signed document to server 101. The user may also need to submit request information about the tasks server 101 is expected to perform, should it not be obvious from the document itself.

In step S202 server 101 accesses authorizations 106 and schemas 112 to pull together the additional information it needs beyond the request itself. This will include an identification of the types of documents the signer is authorized to sign, any additional constraints or limits, and information on how to discriminate and identify the actual document type presented (XML schemas, regular expressions, etc).

Thereafter, all of this information is processed in step S203 to identify actual document type presented, determine that the document is one the signer is authorized to sign, that the signature is in the right document location and covers the right portions or all of the document, verify the signer's signature and the signer's public key certificate using standard PKI and public key cryptography techniques, determine that the document does not contain data that is beyond the signer's authority such as monetary or date constraints. When these and other organizational constraints are satisfied, server 101 has established the signer was within their authority. If not, rejection message are sent to the submitter at browser 102 and client application 103, the error recorded in logs 111, and the process is aborted.

In step S204 server 101 appropriately appends or inserts an attestation, that the document was signed by a signer with the proper authority. If the specific implementation is to also provide machine readable data elements, they are appended or inserted at this time. Server 101 then calculates a hash (message digest) of all the content it intends to sign, which includes all of the attestation information, the signer's signature, and an unambiguous identification of all the signed content to be covered by server 101's signature, and may optionally include all the content signed by the signer, should the user have requested server 101 do so. This could provide the additional benefit of extending the life of the original signer signature. The identification of all the server 101 signed content assists in later verification. Server 101's signature is then inserted or appended to the document. Server 101 should make an appropriate entry in logs 112.

In step S205, the enhanced document, the original document with the authority endorsement added, is returned to the submitter.

Various other options are available to use system 100. In another embodiment of the present invention, server 101 signs on behalf of the user. If users trust their signing keys will be kept securely in keystore 107 and the keys cannot be accessed except after strong authentication, then server 101 can accept an unsigned document and apply a digital signature using the user's private key stored in key store 107. Server 101 would still perform the required authority checks before applying authority endorsements as described above.

In yet another embodiment of the present invention, server 101 stores the user's signing keys in key store 107 and signs on behalf of the users as before, but the users' public key certificates contain authority information. This authority information constitutes an endorsement if the CA signs the certificate containing the embedded authority information. Server 101 performs the required authority checks before signing on the user's behalf. Because the user's public key certificate contains authority information (signed by a trusted CA), there is no need for server 101 to apply an additional authority endorsement.

In one aspect of the present invention, user signatures with the appropriate authority endorsements provide for later authority verification. No special databases or other external services, other than the trusted public key certificates of an industry standard PKI are needed for long-term authority verification.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for verifying authority of a signer of a document, the method comprising:
   receiving, at a server, the document after the signer has signed the document, wherein the document is electronically signed;
   verifying, by the server, identity of the signer;
   establishing, by the server, a type for the document;
   establishing, by the server, the authority of the signer to sign the type of document and that the document is signed by the signer, wherein establishing, by the server, the authority of the signer to sign the type of document further comprises:
   identifying, by the server, the type of documents the signer is authorized to sign and constraints on the authority of the signer;
   responsive to establishing, by the server, the authority of the signer to sign the type of document and that the document is signed by the signer, referencing, by the server, an authority endorsement with the document, wherein the authority endorsement comprises an attestation of the authority of the signer at the time the authority server signed the attestation; and
   identifying a hash of all contents of the document which are signed, wherein the hash is a digest of the contents, wherein the contents comprise the authority endorsement, a signature of the signer, and an identification of content covered by the signature.

2. The method of claim 1, further including presenting authority endorsement for visual processing.

3. The method of claim 1, wherein establishing the signer's authority further comprising the step of verifying that the signer has the authority to sign the document within a predetermined constraint.

4. The method of claim 3, wherein the predetermined constraint is level of authority.

5. The method of claim 3, wherein the predetermined constraint is amount.

6. The method of claim 3, wherein the predetermined constraint is quantity.

7. The method of claim 3, wherein the predetermined constraint is time.

8. A method for signing on behalf of a signer and endorsing an authority of the signer, the method comprising:
   receiving a document by a server on behalf of the signer, wherein the document is electronically signed;
   verifying, by the server, identity of the signer;
   signing, by the server, on behalf of the signer by applying a digital signature to the electronic document, the digital signature indicative of the signer;
   establishing, by the server, a document type;
   establishing, by the server, the authority of the signer to sign the type of document;
   responsive to establishing, by the server, the authority of the signer to sign the type of document, including, by the server, an authority endorsement with the document, wherein the authority endorsement comprises an attestation of the authority of the signer at the time the authority server signed the attestation; and
   identifying a hash of all contents of the document which are signed, wherein the hash is a digest of the contents, wherein the contents comprise the authority endorsement, a signature of the signer, and an identification of content covered by the signature.

9. The method of claim 8, further including presenting authority endorsement for visual processing.

10. The method of claim 8, wherein establishing the signer's authority further comprising the step of verifying that the signer has the authority to sign the document with a predetermined constraint.

11. The method of claim 10, wherein the predetermined constraint is level of authority.

12. The method of claim 10, wherein the predetermined constraint is amount.

13. The method of claim 10, wherein the predetermined constraint is quantity.

14. The method of claim 10, wherein the predetermined constraint is time.

15. A method for signing on behalf of a signer whose public key certificate contains an authority or policy extension, the method comprising:

receiving a document by a server on behalf of the signer, wherein the document is electronically signed;

verifying, by the server, identity of the signer;

establishing, by the server, the a document type;

establishing, by the server, the authority of the signer to sign the type of document using the authority or policy extension of the public key certificate of the signer;

responsive to establishing, by the server, the authority of the signer to sign the type of document using the authority or policy extension of the public key certificate of the signer, signing, by the server, on behalf of the signer by applying a digital signature with embedded authority information of the signer to the electronic document, the digital signature indicative of the identity and authority of the signer, wherein the authority endorsement comprises an attestation of the authority of the signer at the time the authority server signed the attestation; and identifying a hash of all contents of the document which are signed, wherein the hash is a digest of the contents, wherein the contents comprise the authority endorsement, a signature of the signer, and an identification of content covered by the signature.

16. The method of claim 15, wherein establishing the signer's authority further comprising the step of verifying that the signer has the authority to sign the document with a predetermined constraint.

17. The method of claim 16, wherein the predetermined constraint is level of authority.

18. The method of claim 16, wherein the predetermined constraint is amount.

19. The method of claim 16, wherein the predetermined constraint is quantity.

20. The method of claim 16, wherein the predetermined constraint is time.

21. A system for verifying the authority of a signer of a document, the system comprising:

a server configured to receive a document, wherein the document is electronically signed;

verify identity of the signer;

establish a type for the document;

establish the authority of the signer to sign the type of electronic document;

including an authority endorsement with the electronically signed document in response to establishing the authority of the signer to sign the type of document and that the document is signed by the signer, wherein the authority endorsement comprises an attestation of the authority of the signer at the time the authority server signed the attestation; and identify a hash of all contents of the document which are signed, wherein the hash is a digest of the contents, wherein the contents comprise the authority endorsement, a signature of the signer, and an identification of content covered by the signature.

22. The system of claim 21, wherein the server verifies that the signer has the authority to sign the document within a predetermined constraint.

23. The system of claim 21, wherein the predetermined constraint is level of authority.

24. The system of claim 21, wherein the predetermined constraint is amount.

25. The system of claim 21, wherein the predetermined constraint is quantity.

26. The system of claim 21, wherein the predetermined constraint is time.

27. The system of claim 21, further configured to present authority endorsement for visual processing.

* * * * *